United States Patent [19]

Nakabayashi

[11] Patent Number: 5,436,760
[45] Date of Patent: Jul. 25, 1995

[54] OPTICAL FIBER AMPLIFIER WITH GAIN EQUALIZING CIRCUIT

[75] Inventor: Yukinobu Nakabayashi, Tokyo, Japan

[73] Assignee: NEC Corporation, Tokyo, Japan

[21] Appl. No.: 273,137

[22] Filed: Jul. 14, 1994

[30] Foreign Application Priority Data

Jul. 14, 1993 [JP] Japan .................................. 5-174254

[51] Int. Cl.[6] .................... H04B 10/17; G02F 1/35; H01S 3/00
[52] U.S. Cl. .................................. 359/341; 359/132; 359/589
[58] Field of Search ............... 359/124, 132, 194, 234, 359/236, 341, 589, 590; 372/23, 26

[56] References Cited

U.S. PATENT DOCUMENTS

| 4,928,172 | 5/1990 | Uehara et al. | 358/98 |
| 5,214,494 | 5/1993 | Inaba et al. | 356/419 |
| 5,225,922 | 7/1993 | Chraplyvy et al. | 359/124 |
| 5,231,529 | 7/1993 | Kaede | 350/124 |
| 5,276,543 | 1/1994 | Olshansky | 359/124 |

FOREIGN PATENT DOCUMENTS 389644 4/1991 Japan .
3206427 9/1991 Japan .

OTHER PUBLICATIONS

"Passive WDM channel equaliser using a twin-core erbium-doped fibre amplifier" by M. N. Zervas, et al. Optoelectronics Research Centre, 96/MA4-1-99-/MA4-4.

"Automatic gain flattening in Er-doped-fiber amplifiers", by V, L. Da Silva, et al., OFC.100C '93 Technical Digest, pp. 174-177.

"Gain Equalization in Multiwavelenght Lighwave Systems Using Acoustooptic Tunable Filters", by S. F. Su et al., IEEE Photonics Technology Letters, vol. 4, No. 3, Mar. 1992, pp. 269-271.

"Equalization in Amplified WDM Lightwave Transmission Systems" by A. R. Chraplyvy et al., IEEE Photonics Technology Letters, vol. 4, No. 8, Aug. 1992 pp. 920-922.

"End-to-End Equalization Experiments in Amplified WDM Lightwave Systems" by A. R. Chraplyvy et al., IEEE Photonics Technology Letters, vol. 4, No. 4, Apr. 1993 pp. 428-429.

"Tunable Gain Equalization Using A Mach-Sehnder Optical Filter in Multistage Fiber Amplifiers" by Kyo Inoue et al., IEEE Photonics Technology Letters, vol. 3, No. 8, Aug. 1991 pp. 718-720.

"A 100-Channel Optical FDM Six-Stage In-Line Amplifier System Employing Tunable Gain Equalizers" by Hiromu Toba et al., IEEE Photonics Technology Letters, vol. 5, No. 2, Feb. 1993 pp. 248-251.

"Impact of the Er-doped fiber amplifier on optical communication by the Er-doped fiber amplifier" by S. Shimada, O plus E, 113, Apr. 1989, pp. 75-81.

"A 212 km Non-Repeated Transmission Experiment at 1.8 Gb/s Using LD Pumped $ER^{3+}$Doped Fiber Amplifiers in a IM/Direct Detection Repeater System", by K. Hagimoto et al., NTT Transmission Systems Laboratories, PD15-1-PD≡-4.

Primary Examiner—Nelson Moskowitz
Attorney, Agent, or Firm—Sughrue, Mion, Zinn, Macpeak & Seas

[57] ABSTRACT

An optical fiber amplifier includes an optical amplifying section having an Er-doped fiber. A gain equalizing section is provided at secondary stage of the optical amplifying section and has an optical filter unit for compensating for wavelength dependency characteristics of a signal gain at the optical amplifying section. The gain equalizing section has a filter rotating device and the optical filter unit has et least two optical filters of transparent multi-layer film in which a layer of high refractive index and a layer of low refractive index are alternately and repeatedly stacked. The optical filter is rotated by the filter rotating device such that the wavelength transmission characteristics of the optical filter are set by changing an angle of incidence of the signal light with respect to the optical filter and the wavelength dependency characteristics of the signal gain are compensated for. The optical filter which is of the multi-layer film and which is rotatably arranged improves wavelength tunability.

4 Claims, 4 Drawing Sheets

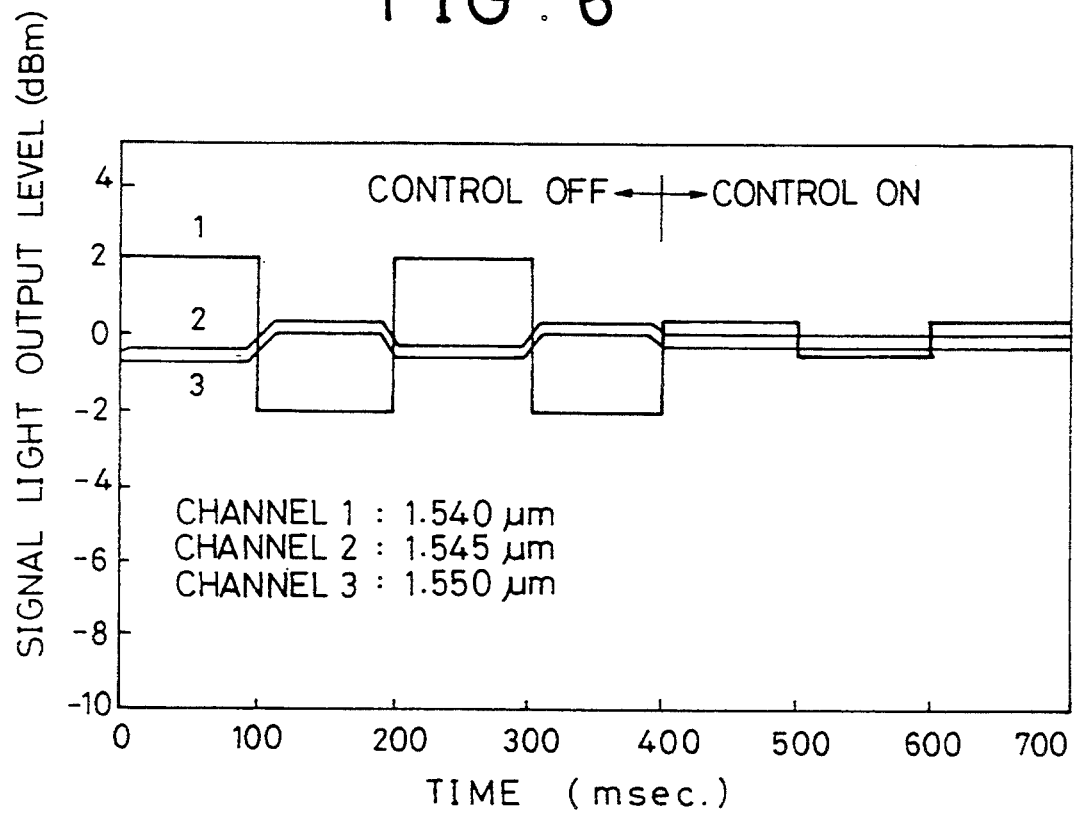

OPTICAL FIBER AMPLIFIER WITH GAIN EQUALIZING CIRCUIT

BACKGROUND OF THE INVENTION (1) Field of the Invention

The present invention relates to an optical fiber amplifier operable in the 1.5 μm band, and more particular to an optical fiber amplifier which is provided with a gain equalizing circuit.

(2) Description of the Related Art

An erbium (Er)-doped fiber amplifier can be adopted widely in a variety of applications including optical booster amplifiers, optical relay devices and optical preamplifiers due to its high saturation output and high gain characteristics and due to polarization non-dependency characteristics. Thus, the extent to which the Er-doped fiber amplifier can be used in optical communication has expanded remarkably. An example in which the Er-doped fiber amplifier is used in the optical communication has been disclosed by K. Hagimoto, K. Iwatsuki, A. Takada, M. Nakazawa, M. Saruwatari, K. Aida, K. Nakagawa and M. Horiguchi under the title "A 212 km non-repeated transmission experiment at 1.8 Gb/s using LD pumped Er3+-doped fiber amplifiers in an IM/-direct detection repeater system", presented at OFC 89, PD-15 (January 1989). S. Shimada has written about "Impact of the Er-doped fiber amplifier on optical communication by the Er-doped fiber amplifier" in O plus E, 113, p. 75 (April 1989). Furthermore, K. Nakagawa, S. Nishi, K. Aida and E. Yoneda have written about "Trunk and distribution network application of erbium-doped fiber amplifier", IEEE J. Lightwave Technology, Vol., 9, No. 2, pp. 198–208 (February 1991).

However, when applied to wavelength-multiplexed communication systems, the optical signal in which the wavelength at the gain is relatively low degrades severely due to the signal wavelength dependency characteristics of the gain of the Er-doped fiber amplifier. As an example of a means to solve this problem, a method for setting a signal bandwidth for each signal beam proportionally to a gain of each wavelength based on the gain bandwidth characteristics of an optical fiber amplifier has been proposed in Japanese Patent Application Kokai Publication No. Hei 03-089644 (Apr. 15, 1991). Also, a method for making use of a wavelength-multiplexed transmission system or an optical type Mach-Zehnder equalizer has been disclosed by H. Toba, K. Nakanishi, K. Oda, K. Inoue and T. Kominato under the title "A 100-Channel Optical FDM Six-Stage In-Line Amplifier System Employing Tunable Gain Equalizers" in IEEE Photonics Technology Letters, Vol. 5, No. 2, pp. 248–251 (February 1993).

However, where multi-stage amplification is performed, for example, it is difficult to compensate for accumulated gain unbalance or it becomes costly to fabricate a gain equalizer and, where a fiber type Mach-Zehnder gain equalizer is used, there is a problem associated with speed of response since the wavelength-transmittance characteristics are controlled by means of temperature control of the fiber. Thus, no ideal solution to these problems has been available. Also, with respect to analog optical transmission, it has been reported that, due to the signal wavelength dependency of gain of an Er-doped fiber amplifier, a compound secondary distortion occurs, resulting in the degradation of transmission signals. In this relation, there is a report on the compensation of gain using an optical bandpass filter in which the tuned wavelength of the filter is slightly deviated from the wavelength of the optical signal (by K. Kikushima, under the title "Using Equalizers to Offset the Deterioration in SCM Video Transmission due to Fiber Dispersion and EDFA gain tilt" in IEICE, 1992, B-705). However, this cannot be used where the signal is of multi-wavelengths.

Therefore, in order to solve the above problems, there is a need for the development of a technique for the compensation of the gain in the Er-doped fiber amplifier.

SUMMARY OF THE INVENTION

An object of the present invention, therefore, is to overcome the problems existing in the prior art and to provide an improved optical fiber amplifier operable in a 1.5 μm band.

According to one aspect of the invention, there is provided an optical fiber amplifier comprising:

an optical amplifying section having an Er-doped optical fiber; and a gain equalizing section provided at a secondary stage of the optical amplifying section and having an optical filter unit for compensating for wavelength dependency characteristics of a signal gain at the optical amplifying section.

In the optical amplifier thus provided, the signal wavelength dependency of the gain of the Er-doped fiber amplifier is solved by using a simple technique conceptionally different from that in the prior art. That is, by means of the optical filter provided at a secondary stage of the Er-doped fiber amplifying section, the signal wavelength dependency of the gain of the amplifying section is compensated for and this enables the provision of an optical amplifier in which the signal wavelength dependency characteristics of the gain are excellent.

The optical filter in the embodiment according to the invention is constituted by a transparent multi-layer film in which layers of high refractive index and low refractive index are alternately repeated. By employing a configuration wherein two or more filters are provided, with each filter made of a multi-layer film having layers whose wavelength transmission characteristics are different from one another, it is thus possible to realize greater freedom for the wavelength transmission characteristics. In this configuration, the filters are rotatable and, by changing the angle of incidence of the signal light with respect to the optical filters, that is, by changing the wavelength transmission characteristics as desired, it is possible to appropriately compensate for the signal wavelength dependency characteristics of the gain of the amplifying section.

The optical amplifier of the embodiment according to the invention includes a gain monitoring section for detecting the signal wavelength dependency characteristics of the signal gain of the amplifier. In order to achieve the optimum compensation of the gain, a predetermined wavelength channel is selected from the signals of a plurality of channels and the level of light intensity of the selected wavelength channel is detected by a level detection means. Furthermore, the light intensity level deviations among the wavelength channels are computed by arithmetic control means and the level deviations among the wavelength channels are controlled to a minimum. In this embodiment, since the multi-layer film consists of layers formed of repeated dielectric materials, the control is carried out by changing the angle of incidence of the signal light with respect to the optical filter. The control in this way enables the realization of an arrangement wherein a high speed and stable control can be made using a simple structure.

The invention is based on the idea that, by adjusting the thickness and the number of layers in the transparent multi-layer film with the layers having high and low refractive indices, it is possible to obtain a desired transmission characteristic. By using two or more filters of the above configuration and setting the space between such filters to be larger than the coherence length of the light, it is possible to achieve independent control of the wavelength transmission characteristics of each filter. Also, by changing the angle of incidence of light and changing its transmission characteristics, which are effected by rotation of the filter, it is possible to achieve the desired wavelength transmission characteristics and to reduce the wavelength dependency characteristics of gain to a minimum.

The gain monitoring section for detecting the wavelength characteristic dependency of the gain takes out a predetermined wavelength channel from a plurality of amplified signal beams, then the levels of the signal beams taken out are detected by the detection means, and the level intensity of each of the wavelength channels is converted to electrical signals. As means to select the predetermined wavelength channel, various alternatives are conceivable. For example, each wavelength channel selected, using a transmission wavelength tunable narrow bandpass filter, may be converted to electrical signals by using a photoelectric conversion element. Or, after the signal beams are distributed to a plurality of beams corresponding to the number of the wavelength channels, each wavelength may be selected from each of the distributed signal beams by using a narrow bandpass filter and be subjected to photoelectric conversion. From the electric signals thus obtained, the level deviation among the signal beams is computed.

The prior art techniques known are those for gain equalization may be divided roughly into three groups. The first one thereof being for flattening wavelength dependency characteristics of the gain, the second being for flattening wavelength dependency characteristics of outputs by adjusting the input signal intensity for off-setting the wavelength dependency characteristics of the gain, and the third being for adding a tunable filter of some kind to the amplifier. The present invention belongs to the third group wherein the tunable filter is used. As the tunable filter in the prior art, a Mach-Zehnder interferometer or an ecoust-optic filter has been used, but the present invention adopts the multi-layer film filter and, moreover, such filter is rotatably arranged for improved tunability of wavelengths.

BRIEF DESCRIPTION OF THE DRAWINGS

The above and other objects, features and advantages of the present invention will be apparent from the following description of preferred embodiments of the invention explained with reference to the accompanying drawings, in which:

FIG. 6 is a diagram showing wavelength gain characteristics of the signals which have been gain-compensated in the manner explained for the embodiment according to the invention.

PREFERRED EMBODIMENT OF THE INVENTION

Now, a preferred embodiment of the invention is explained with reference to the drawings.

Figure 1:
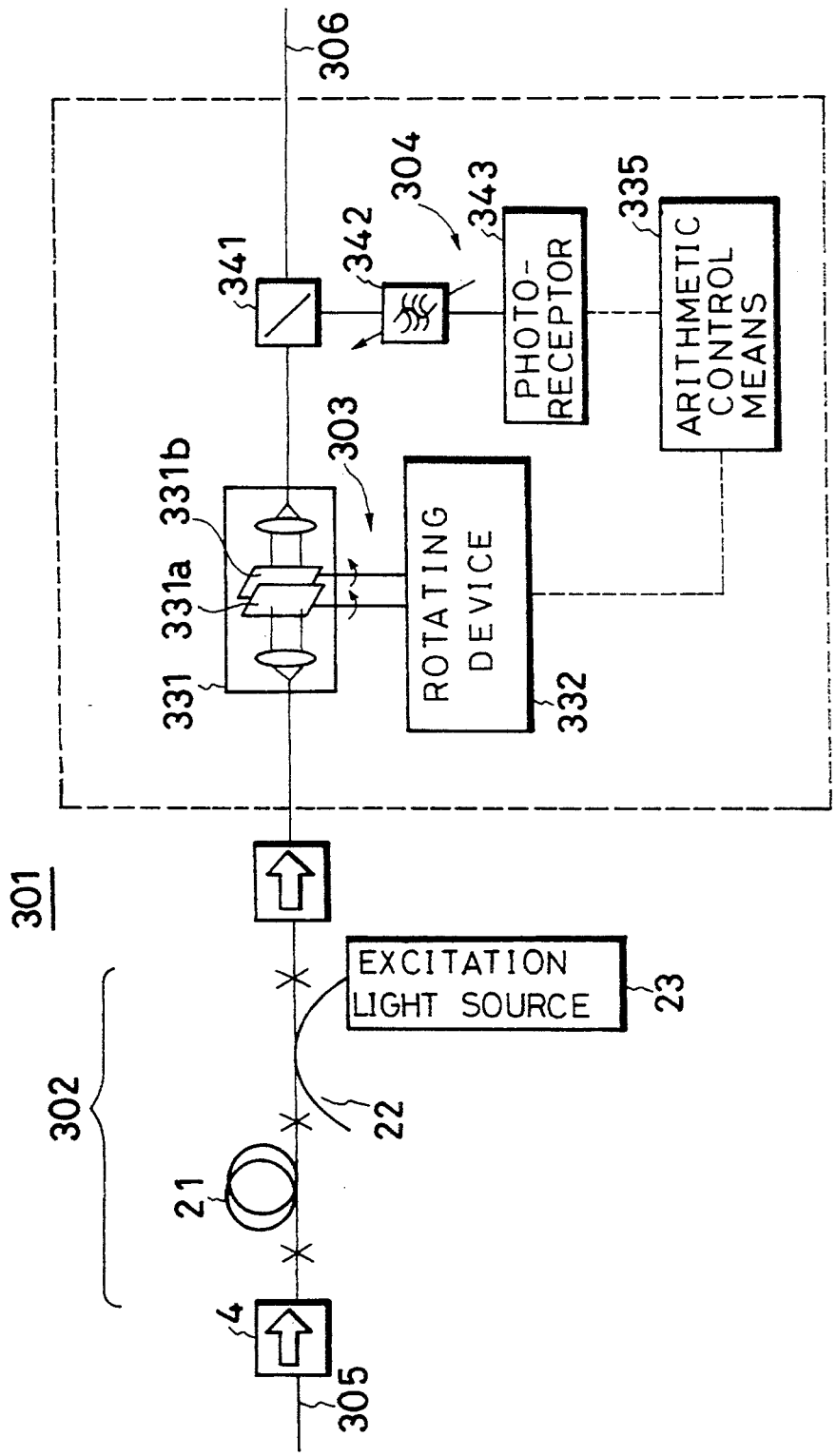
FIG. 1 is a schematic diagram showing an example of an optical amplifier of an embodiment according to the invention.

As shown in FIG. 1, an optical amplifier 301 has an optical amplifying section 302, a gain equalizer section 303 and a gain monitoring section 304. The signal light amplified at the optical amplifying section 302 is gain-compensated at the gain equalizer section 303. At the gain equalizer section 303, two optical filters 331a and 331b in an optical filter unit 331 are so arranged as to be rotated by a rotating means 332. In this example, each of the filters is constituted by a dielectric multi-layer film including a high refractive index layer made of, for example, titanium dioxide, and a low refractive index layer made of, for example, magnesium fluoride. With the optical filters having such a configuration, the transmittance characteristics of the filters can be set as desired simply by rotating the filters. It is effective if an optical isolator 4 is provided in the optical amplifier 301 in order to suppress the oscillation and the increase of the noise.

The input signal introduced from an input port 305 passes through the optical isolator 4 and, when passing through an Er-doped fiber 21, is optically amplified. The excitation beams for amplification are introduced from an excitation light source 23 into the Er-doped fiber 21 through a WDM (wavelength-division-multiplexed) coupler 22. The excitation light source 23 generally employs a laser diode having a band of 0.98 $\mu$m or 1.48 $\mu$m.

The gain equalizer section 303 is added in order to improve the wavelength dependency of the gain. The gain equalizer section 303 consists of the optical filter unit 331, the rotating device 332 and an optical system for introducing the light into the optical filter unit 331. Each of the optical filter 331a and 331b in the optical filter unit 331 is rotated by the rotating device 332 so that the center wavelength of the transmittance may be set as desired.

Figure 2:
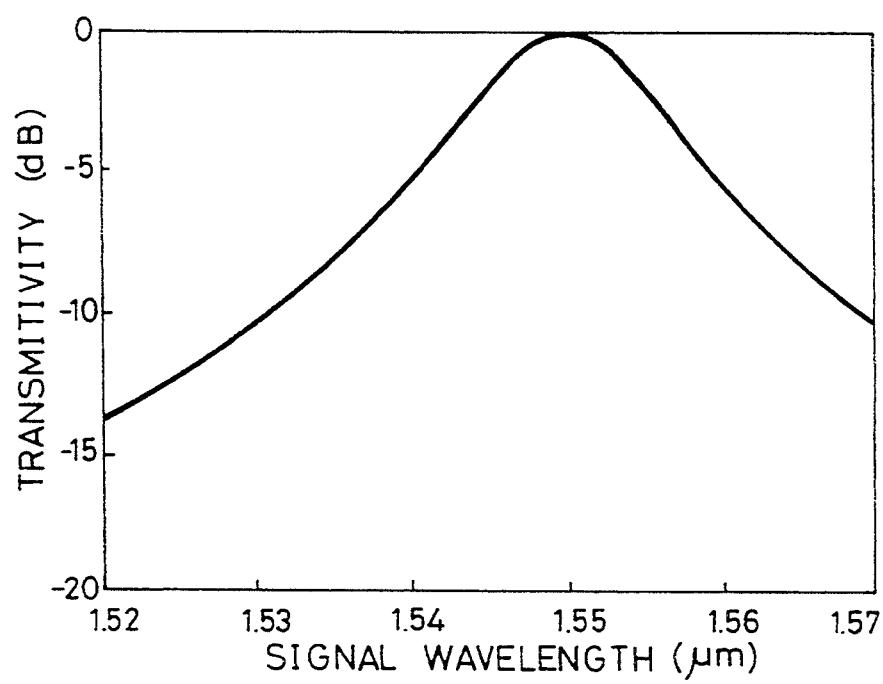
FIG. 2 is a graph showing an example of wavelength transmission characteristics of the filter according to the invention.
Figure 3:
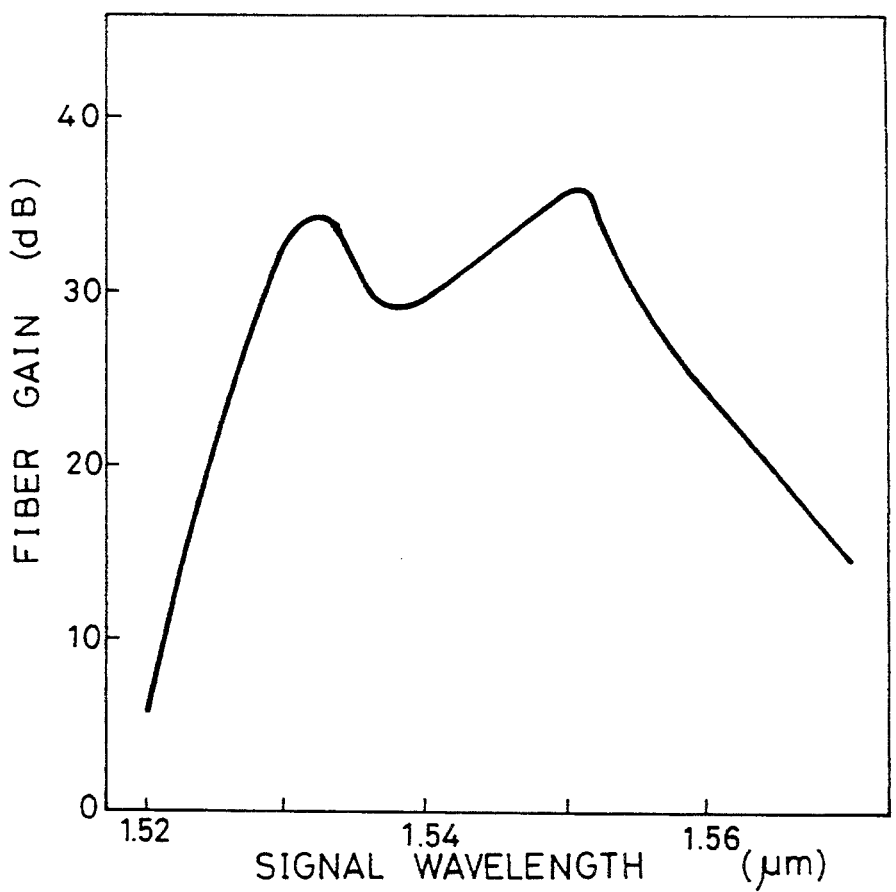
FIG. 3 is a graph showing an example of wavelength amplification characteristics of the signals gain-compensated by the amplifier according to the invention.
Figure 4:
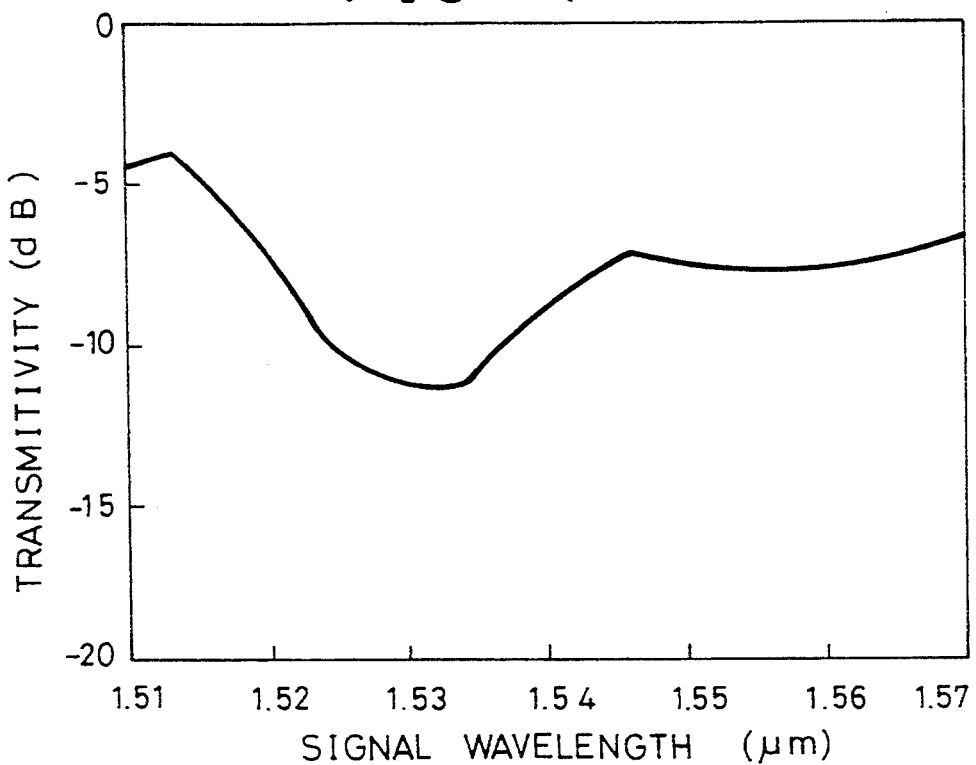
FIG. 4 is a graph showing another example of wavelength transmission characteristics of the filter according to the invention.
Figure 5:
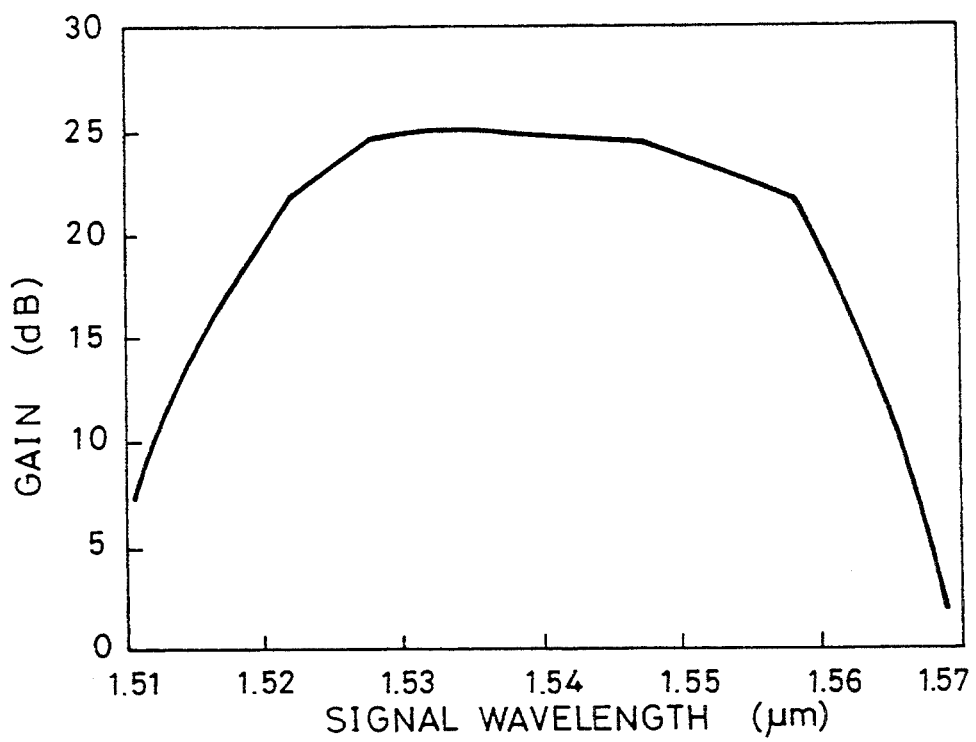
FIG. 5 is a graph showing an example of wavelength amplification characteristics of the signals gain-compensated by the amplifier having the wavelength characteristics shown in FIG. 4.

FIG. 2 shows an example of the wavelength transmittance characteristics of the filter in the optical amplifier according to the invention. In this filter, if the center wavelength is set at 1.57 $\mu$m and $\lambda/4$ films of high refractive index and low refractive index are made respectively as H and L, the filter becomes a bandpass filter whose structure may be expressed as Air-(HL)$^3$H(2L)H(LH)$^3$. When this filter is used for carrying out gain compensation, it is possible to construct an optical amplifier having the wavelength dependency characteristics of the gain as shown in FIG. 3. Also, in order to effectively suppress an excess gain of the 1.53 $\mu$m band, if an edge filter having a boundary in the neighborhood of 1.52 μm is combined, it is possible to construct an optical amplifier having the wavelength dependency characteristics as shown in FIG. 4. When such a filter is used for the compensation of the gain, it is possible to construct the optical filter which excels in flatness and smoothness of wavelength characteristics as shown in FIG. 5. When any of these filters is used, the center wavelength of the transmittance can be shifted by about 1 nm/deg. by the rotating device so that it is always possible to obtain the desired wavelength characteristics of the gain.

From each signal light channel that has passed through the optical filter unit 331, a part thereof is divided by a beam splitter 341, and this part is further resolved on a signal to signal basis by a wavelength tunable filter 342. By periodically changing the transmittance wavelengths of the wavelength tunable filter 342, it is possible to monitor the gain characteristics of all the channels. The signal beams of each channel thus obtained are converted to electrical signals by a photoreceptor 343. The gain monitoring section 304 then computes from the resulting electrical signals a level deviation among the signal beams of the respective wavelength channels. The level deviation can be defined as a reference deviation of a signal potential obtained by, for example, the photoreceptor 343. Here, by changing the direction of the angle at which the optical filter 331 is rotated, it is possible to change a level deviation among the signal beams. If, as a result, the deviation increases, the optical filter may be rotated in an opposite direction. The repetition of this process enables the determination of the optimum rotating angle of the desired number of optical filters.

FIG. 6 shows wavelength gain characteristics of the signals which have been gain-compensated in the manner explained above. In this case, three wavelength channels, namely, those for 1.53 μm, 1.54 μm and 1.55 μm, have been monitored and have been controlled for equalization of the gains thereof. Also, for channel 1, having a wavelength of 1.535 μm among the three channels, the input signal intensity has been intensity-modulated at a period of 200 msec. As seen in FIG. 6, where the control is not conducted (CONTROL OFF) in compensating for the gain, the signal light output changes along with the modulation of the signal light. Also, it is to be noted that, due to the modulation of the signal light of channel 1, an intermodulation (IM) occurred in the other two channels 2 and 3 which have not been subjected to modulation. Thus, it can be appreciated from FIG. 6 that, due to the introduction of the control (CONTROL ON) as explained above, the problem associated with output level changes has been almost completely solved and the intermodulation has been suppressed.

The embodiment according to the invention has employed the tunable optical filter for monitoring the output of each signal light channel. However, the invention is not limited to the use of only such a filter. For example, if it is desired to monitor three channels or wavelengths, the signal light beams may be split into three, whereby the split beams may be transmitted respectively through wavelength fixed filters set to the respective wavelengths and then be led to photoreceptors. By employing such an arrangement, the same or similar control as explained above may be expected.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. An optical fiber amplifier comprising:
    an optical fiber amplifying section having an Er-doped optical fiber;
    a gain equalizing section provided at a secondary stage of said optical fiber amplifying section, said gain equalizing section comprising a filter rotating means; and
    an optical filter unit for compensating for wavelength dependent characteristics of a signal gain at said optical amplifying section, said optical filter unit comprising at least two optical filters each of which is a transparent multi-layer film with a layer of high refractive index and a layer of low refractive index being alternately and repeatedly stacked, each of said at least two optical filters being rotatably carried by said filter rotating means such that the wavelength transmission characteristics of said optical filter are set by changing an angle of incidence of a signal beam with respect to said optical filter unit and the wavelength dependency characteristics of said signal gain are compensated for.

2. The optical fiber amplifier according to claim 1, in which a space between said at least two optical filters is larger than a coherent length of the signal beam.

3. The optical fiber amplifier according to claim 1, in which said layer of high refractive index is made of titanium dioxide and said layer of low refractive index is made of magnesium fluoride.

4. The optical fiber amplifier according to claim 1, which further comprises a gain monitoring section for detecting wavelength dependency characteristics of said signal gain, said gain monitoring section comprising:
    a selection means for selecting a predetermined wavelength channel from a plurality of signal beams amplified at said optical amplifying section;
    a detection means for detecting levels of light intensity for each of the wavelength channels selected by said selection means; and
    an arithmetic control means for computing mutual level deviations of light intensity of said wavelength channels at said levels of light intensity detected by said detection means, said arithmetic control means operating to control said gain equalizing means such that any deviations among said wavelength channels become minimum.

* * * * *